US010021573B2

(12) United States Patent
Chou et al.

(10) Patent No.: US 10,021,573 B2
(45) Date of Patent: Jul. 10, 2018

(54) METHOD AND DEVICE FOR UPLINK TRANSMISSION BY USING UNLICENSED SPECTRUM (71) Applicant: INDUSTRIAL TECHNOLOGY RESEARCH INSTITUTE, Hsinchu (TW)

(72) Inventors: Chie-Ming Chou, Zhubei (TW); Chun-Chia Chen, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 152 days.

(21) Appl. No.: 15/080,994

(22) Filed: Mar. 25, 2016

(65) Prior Publication Data

US 2016/0302076 A1    Oct. 13, 2016

Related U.S. Application Data (60) Provisional application No. 62/146,427, filed on Apr. 13, 2015.

(30) Foreign Application Priority Data

Mar. 22, 2016 (TW) .............................. 105108857 A (51) Int. Cl.
*H04W 16/14* (2009.01)
*H04W 74/08* (2009.01)
(Continued)

(52) U.S. Cl.
CPC ....... *H04W 16/14* (2013.01); *H04W 52/0225* (2013.01); *H04W 72/14* (2013.01);
(Continued)

(58) Field of Classification Search
None
See application file for complete search history.

(56) References Cited

U.S. PATENT DOCUMENTS 9,031,017 B2    5/2015 Ratasuk et al.
2003/0054829 A1*  3/2003 Moisio .................. H04W 72/10
455/452.1
(Continued)

FOREIGN PATENT DOCUMENTS

CN       105024790 A    11/2015
TW       201517678 A     5/2015
(Continued)

OTHER PUBLICATIONS

Taiwanese Office Action dated Feb. 16, 2017.
(Continued)

*Primary Examiner* — Andrew Lai
*Assistant Examiner* — Jamaal Henson
(74) *Attorney, Agent, or Firm* — Rabin & Berdo, P.C.

(57) ABSTRACT

A method, adapted to a communication device, for uplink transmission by using unlicensed spectrum is provided. The method includes following steps. Acquiring transmission resource based on a listen-before-talk (LBT) procedure. Sending an LBT indicator to a base station after successfully acquiring the transmission resource. Receiving a uplink resource grant from the base station. Performing uplink data transmission with the base station on the unlicensed spectrum according to the uplink resource grant.

24 Claims, 8 Drawing Sheets (51) Int. Cl.
*H04W 52/02* (2009.01)
*H04W 72/14* (2009.01)

(52) U.S. Cl.
CPC ......... *H04W 74/0833* (2013.01); *Y02D 70/00* (2018.01); *Y02D 70/1262* (2018.01); *Y02D 70/142* (2018.01); *Y02D 70/24* (2018.01); *Y02D 70/26* (2018.01)

(56) References Cited

U.S. PATENT DOCUMENTS

| | | | |
|---|---|---|---|
| 2009/0086684 | A1 | 4/2009 | Kelly et al. |
| 2013/0003591 | A1* | 1/2013 | Novak ................ H04W 72/085 370/252 |
| 2013/0088983 | A1* | 4/2013 | Pragada ................ H04W 16/14 370/252 |
| 2013/0265923 | A1 | 10/2013 | Wang et al. |
| 2013/0279343 | A1 | 10/2013 | Jeong et al. |
| 2014/0341053 | A1 | 11/2014 | Bhushan et al. |
| 2015/0049712 | A1 | 2/2015 | Chen et al. |
| 2015/0057011 | A1 | 2/2015 | Di Girolamo et al. |
| 2015/0085797 | A1 | 3/2015 | Ji et al. |
| 2015/0092702 | A1 | 4/2015 | Chen et al. |
| 2015/0181453 | A1 | 6/2015 | Chen et al. |
| 2015/0256303 | A1 | 9/2015 | Belghoul et al. |
| 2015/0341921 | A1* | 11/2015 | Chen ................. H04W 72/0413 370/330 |
| 2016/0073344 | A1* | 3/2016 | Vutukuri ........... H04W 52/0216 370/252 |
| 2016/0234861 | A1* | 8/2016 | Ye ..................... H04W 74/0808 |

FOREIGN PATENT DOCUMENTS

| | | | | |
|---|---|---|---|---|
| TW | 2016-37477 A | | 10/2016 | |
| WO | WO 2015051486 A1 | * | 4/2015 | ............ H04W 72/00 |

OTHER PUBLICATIONS

"Extending LTE Advanced to unlicensed spectrum", Qualcomm Incorporated, Dec. 2013.
"LTE in Unlicensed Spectrum: Harmonious Coexistence with Wi-Fi", Qualcomm Technologies, Inc., Mar. 2014.
"UL LAA support and UL Scheduling in MAC", 3GPP TSG-RAN WG2 Meeting #90, R2-152243, May 25-29, 2015.
"Dropping of initial UL HARQ transmission in LAA", 3GPP TSG-RAN WG2 #90, Tdoc R2-152482, May 25-29, 2015.
"Uplink transmission for LAA", 3GPP TSG-RAN WG2 Meeting #90, R2-152214, May 25-29, 2015.
"Uplink considerations for LAA-LTE", 3GPP TSG-RAN WG2 Meeting #90bis, R2- 152703, May 25-29, 2015.
"New Work Item on enhanced LAA for LTE", 3GPP TSG RAN Meeting #70, RP-152256, Dec. 7-10, 2015.
Taiwanese Office Action dated Apr. 19, 2018.

* cited by examiner

METHOD AND DEVICE FOR UPLINK TRANSMISSION BY USING UNLICENSED SPECTRUM

This application claims the benefit of U.S. application Ser. No. 62/146,427, filed Apr. 13, 2015 and TW application Serial No. 105108857, filed Mar. 22, 2016, the disclosure of which are incorporated by reference herein in its entirety.

TECHNICAL FIELD

This disclosure is related to communication methods and devices, especially to communication methods and devices for uplink transmission by using unlicensed spectrum.

BACKGROUND

With the development of communication technologies, mobile data usage in consumer electronic products has significantly increased. In response to the large demand of bandwidth, communication supervisory bureaus in many countries have been releasing more and more spectrum and trying to increase the efficiency of usage of spectrum for broadband mobile service. For example, communication mechanisms such as Long Term Evolution in Unlicensed band (LTE-U) and Licensed Assisted Access (LAA) are proposed to expand available spectrum of current mobile communication by using unlicensed spectrum.

However, no matter under LTE-U or LAA, unlicensed spectrum is used to compensate for the shortage of downlink licensed spectrum. There is no effective solution for uplink data transmission for LTE-U or LAA currently.

Therefore, there is a need to propose communication methods and devices capable of using unlicensed spectrum to perform uplink transmission.

SUMMARY

The present disclosure proposes communication methods and devices for uplink transmission by using unlicensed spectrum.

According to an embodiment of the disclosure, a communication method, adapted to a communication device, for uplink transmission by using unlicensed spectrum is provided. The communication method includes steps of: acquiring transmission resource from the unlicensed spectrum based on a listen-before-talk (LBT) procedure; sending an LBT success indicator to a base station after successfully acquiring the transmission resource from the unlicensed spectrum; receiving an uplink resource grant from the base station; performing uplink data transmission with the base station on the unlicensed spectrum according to the uplink resource grant.

According to an embodiment of the disclosure, a communication device, adapted to performing uplink transmission by using unlicensed spectrum is provided. The communication device includes a transceiver and a processing circuit. The processing circuit couples to the transceiver and configures for: acquiring transmission resource from the unlicensed spectrum based on a listen-before-talk (LBT) procedure; sending an LBT success indicator to a base station after successfully obtaining the transmission resource from the unlicensed spectrum; receiving a uplink resource grant from the base station; controlling the transceiver to perform uplink data transmission with the base station on the unlicensed spectrum according to the uplink resource grant.

According to an embodiment of the disclosure, a communication method, adapted to a communication device, for uplink transmission by using unlicensed spectrum is provided. The communication method includes steps of: receiving an uplink resource grant from a base station to trigger a listen-before-talk (LBT) procedure; acquiring transmission resource from the unlicensed spectrum based on the LBT procedure; after successfully acquiring the transmission resource from the unlicensed spectrum, performing an uplink data transmission with the base station on the unlicensed spectrum according to the uplink resource grant.

According to an embodiment of this disclosure, a communication device, adapted to performing uplink transmission by using unlicensed spectrum is provided. The communication device includes a transceiver and a processing circuit. The processing circuit couples to the transceiver and configures for: receiving an uplink resource grant from a base station to trigger a listen-before-talk (LBT) procedure; acquiring transmission resource from the unlicensed spectrum based on the LBT procedure; after successfully acquiring the transmission resource from the unlicensed spectrum, performing an uplink data transmission with the base station on the unlicensed spectrum according to the uplink resource grant.

In order to provide a thorough understanding of the present disclosure, a more detailed explanation with reference both to an accompanying drawing and to preferred embodiments is set forth below.

DETAILED DESCRIPTION

In the context, embodiments of the present disclosure will be apparent by referring to the accompanying drawings. However, the present invention is not limited to the embodiments disclosed below and may be implemented in various different forms. The embodiments of the present disclosure are provided for complying with statutory requirements. Like reference numerals in the drawings refer to like elements throughout the specification.

Figure 1:
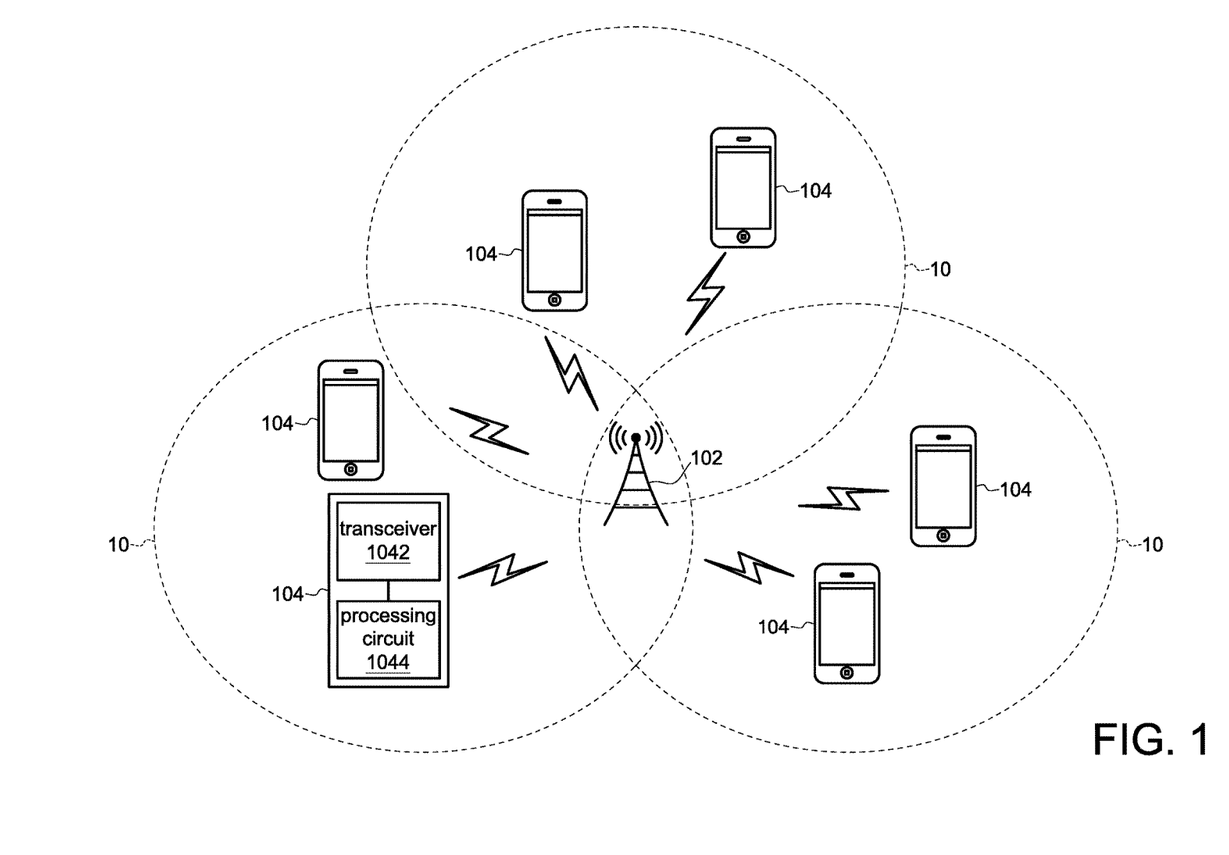
FIG. 1 shows architecture of a schematic communication network according to an embodiment of the disclosure.

FIG. 1 shows architecture of a schematic communication network according to an embodiment of the disclosure. The communication network includes one or more base stations 102 and one or more clients 104. The base station 102 can be an Evolved Node B (eNB) or other small-cell base station. The client 104 can be any communication device having wireless sensing functions such as a personal computer or a portable/wearable electronic device. The client 104 (communication device) includes a transceiver 1042 and a processing circuit 1044. The transceiver 1042, such as a wireless transceiver circuit, can act as an interface between the client 104 and external wireless signals, for transmitting and/or receiving data. The processing circuit 1044 can be a Central Processing Unit (CPU), a microprocessor, a controller or any other computing circuit. The processing circuit 1044 couples to the transceiver 1042 and is configured for executing the proposed communication methods in this disclosure. In an embodiment, the processing circuit 1044 may control the transceiver 1042 for performing data transmission (e.g., transmitting and/or receiving data, signal and/or indicator).

The base station 102 provides network communication service for the clients 104 within its service coverage thereby forming a service cell 10. The base station 102 may transmit control signaling/data with the clients 104 through downlink/uplink communication. The base station 102 supports services of multiple carriers, some of which use unlicensed spectrum while others use licensed spectrum.

According to the present disclosure, uplink transmission between the client 104 and the base station 102 can be performed on unlicensed spectrum, so the efficiency of spectrum usage can be increased. The communication solution for uplink transmission can be separated into a configuration stage, a synchronization stage, and a data transmission stage. For comprehension, detailed explanations are set forth in connection with figures.

1. Configuration Stage

In configuration stage, suitable channels on the unlicensed spectrum will be configured as uplink component carrier (CC) between the client 104 and the base station 102. This stage involves procedures of channel measurement, channel selection, and/or channel configuration. The channel measurement procedure is mainly for collecting channel information of unlicensed spectrum for the further execution of channel selection. According to different implementations, major types of this procedure are provided as follows:

(1) Base station 102 controls client 104 to perform channel measurement.

Figure 2:
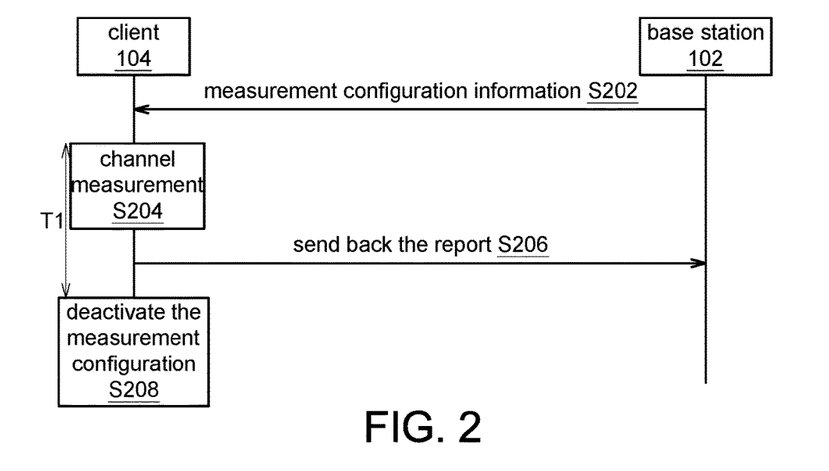
FIG. 2 shows a system flowchart of the channel measurement procedure according to an embodiment of the disclosure.

FIG. 2 shows a system flowchart of the channel measurement procedure according to an embodiment of the disclosure. As shown in FIG. 2, the base station 102 firstly provides measurement configuration information to the client 104, for notifying the client 104 the concerning measure objects (step S202). The measurement configuration information may include, for example, a list of channels for unlicensed spectrum, for indicating the client 104 to measure concerning channels in unlicensed spectrum. The measurement configuration information may further include measurement parameters, which can be any parameter for evaluating the channel quality, such as Received Signal Received Quality (RSRQ), Reference Signal Receiving Power (RSRP), and Received signal strength indication (RSSI). After receiving the measurement configuration information, the client 104 measures one or more channels on the unlicensed spectrum (step S204) to make a report. The client 104 then uses the processing circuit 1044 to control the transceiver 1042 to send back the report to the base station 102 (step S206), such that the base station 102 can utilize the report to select a channel from the unlicensed spectrum for uplink transmission. In an example, the client 104 may send back the report to the base station 102 through a Licensed Component Carrier (LCC) on licensed spectrum until the measurement configuration is deactivated (step S208). The LCC can be, for example, a Primary Component Carrier (PCC).

The client 104 may use the processing circuit 1044 to control the transceiver 1042 to periodically send back the report to the base station 102. In an alternative embodiment, the measurement configuration information from the base station 102 may include a timer T1 to restrict the client 104 to send back the report before the timer T1 expiring. The report can be sent periodically or once by the client 104 before the timer T1 expiring. If the base station 102 receives the report from the client 104 after the timer T1 expiring, the base station 102 considers the report as invalid. Further, when the timer T1 expiring, the client 104 may deactivate the measurement configuration. In practice, since hardware capabilities are different between clients 104, by this way, the base station 102 does not need to spend time to wait for some clients 104 that take too long to send back the report. Also, additional burden on the base station 102 caused by unnecessary reports too frequently sent by the client 104 can be avoided.

(2) Client 104 initiates channel measurement by itself, and sends back report to base station 102.

Figure 3:
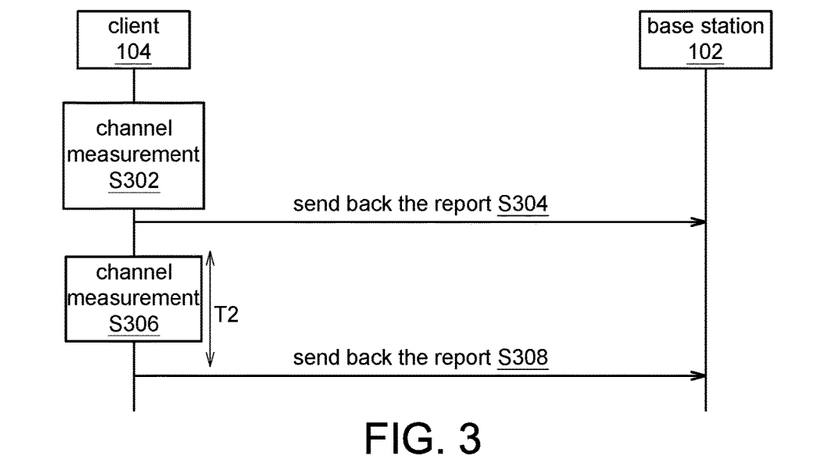
FIG. 3 shows a system flowchart of a channel measurement procedure according to an embodiment of the present disclosure.

FIG. 3 shows a system flowchart of the channel measurement procedure according to an embodiment of the present disclosure. In this embodiment, the client 104 measures one or more channels on unlicensed spectrum (step S302), and then uses the processing circuit 1044 to control the transceiver 1042 to send back the measured report to the base station 102 (step S304). The measured report, for example, includes at least one of the following information: (i) a list including channels entries ordered by channel measurement results (e.g., channel quality), wherein the list includes, for example, channel identifier (ID) and RSSI value; (ii) a mapping table of channel measurement results, in which channels in unlicensed spectrum occupied by radar or other higher prioritized equipment are marked (iii) a preferred band; (iv) a measurement report obtained in an idle mode; and/or (v) an indication for indicating the base station 102 relevant measurement results stored in the client 104, wherein in respond to the request of the base station 102, the client 104 uses the processing circuit 1044 to control the transceiver 1042 to transmit the measurement results to the base station 102. In the example of FIG. 3, to prevent the client 104 from sending back the report too frequently, the client 104 may be assigned with a timer T2, wherein after sending back a report, the client 104 should wait the timer T2 to expire before sending back the next channel measurement report (steps S306, S308).

(3) Base station 102 performs channel measurement by itself.

In this implementation, the base station 102 may perform energy detection toward every channel on unlicensed spectrum to acquire related channel information.

Channel selection procedure is mainly to decide the uplink channel according to the reports obtained from the channel measurement procedure. According to different implementations, main types of channel selection procedure are provided as follows:

(1) Base Station 102 Makes Selection by Itself.

In this implementation, the base station 102 assigns one or more uplink channels to the client 104 based on reports of its measurements. Since information from the client 104 is not taken into consideration, the base station 102 could apply unified channel configuration to all clients 104.

(2) Client 104 Assists Base Station 102 to Select.

In this implementation, the base station 102 assigns one or more uplink channels to the client 104 based on reports from itself and/or the client 104. For example, the client 104 may firstly receive a channel selection result from the base station 102, wherein the channel selection result may be generated by the base station 102 in a channel measurement procedure. Then, the client 104 executes the channel measurement procedure for a candidate channel indicated by the channel selection result, and uses the processing circuit 1044 to control the transceiver 1042 to report a channel measurement result to the base station 102, such that the base station 102 can use the result to select a channel from unlicensed spectrum for uplink transmission.

Figure 4:
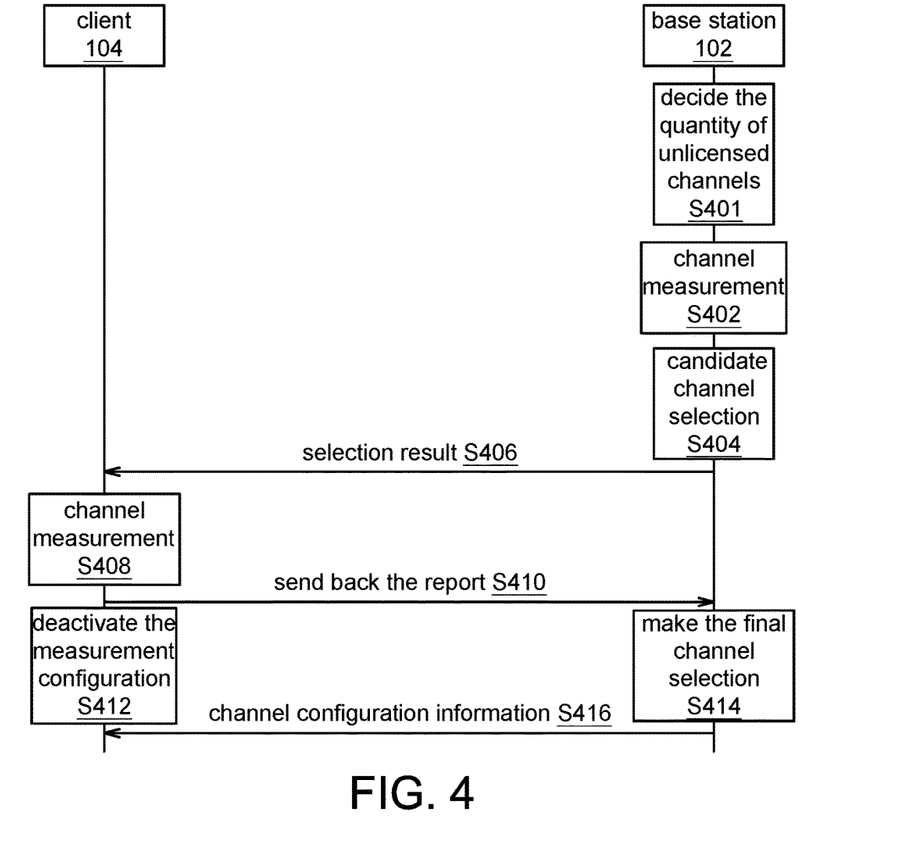
FIG. 4 shows a system flowchart of the channel selection procedure according to an embodiment of the present disclosure.

FIG. 4 shows a system flowchart of the channel selection procedure according to an embodiment of the present disclosure. First, the base station 102 decides how many unlicensed channels can be configured according to the quantity of licensed channels and the capability of the base station 102 (step S401).

Then, the base station 102 executes channel measurement (step S402) to all channels on unlicensed spectrum, and selects candidate channels based on the energy level (step S404). After selecting the candidate channels, the base station 102 sends selection results with relevant information (e.g., frequency, physical identity (PhyID)) to the client 104 by broadcast or dedicated transmission (step S406). If broadcast transmission is adopted, the selection results may be sent by, for example, System Information Block (SIB). If dedicated transmission is adopted, the selection results may be sent by, for example, Radio Resource Control (RRC) signaling. Generally, the update of SIB depends on its modification period. The base station 102 may update its selection results through continuous execution of channel measurement based on long term observation.

After receiving selection results from the base station 102, the client 104 may execute channel measurement for candidate channels (step S408), and use the processing circuit 1044 to control the transceiver 1042 to send back the reports to the base station 102 (step S410). Specifically, since the client 104 and the base station 102 may be separated by a certain distance, and the severity of radar interference may be different, therefore, even if the candidate channel at the location of the base station 102 can be considered as an available channel having passed the channel measurement, the client 104 still needs to execute the channel measurement again to confirm whether the candidate channel at the location of the client 104 avoids radar usage. After sending back the reports, the client 104 deactivates the measurement configuration (step S412). And, after receiving the reports from the client 104, the base station 102 makes the final channel selection to determine the uplink channel (step S414), and sends channel configuration information to the client 104 (step S416).

(3) Base Station 102 Assists Client 104 to Make Selection.

In this implementation, the base station 102 provides the client 104 a channel list for choosing the uplink channel. Then, the client 104 uses the processing circuit 1044 to control the transceiver 1042 to send back the selection result to the base station 102. In this example, since the device preforming the channel selection is the client 104 rather than the base station 102, the client 104 does not need to provide channel measurement results to the base station 102.

(4) Client 104 Makes Selection by Itself.

In this implementation, the client 104 selects channels based on the channel measurement results measured by its own. Since the client 104 can find channels suitable for uplink carriers by performing channel measurement on any unlicensed spectrum, different clients 104 may operate on different channels.

Channel configuration procedure is to negotiate the client 104 with how to use the selected channels. Specifically, after the channel selection procedure is finished, the base station 102 may transmit channel configuration information to the client 104, to provide the client 104 relevant configurations for using the channel. The channel configuration, for example, includes uplink unlicensed band carrier frequency and bandwidth, allowed maximum transmission power, power control scheme parameters, Listen Before Talk (LBT) configuration, Sounding Reference Signaling (SRS) configuration, uplink Cyclic Prefix (CP) length, and Physical Random Access Channel (PRACH) configuration. The configured channel can then be used as a CC for transmitting data between the client and the base station.

2. Synchronization Stage

The main function of synchronization stage is to make uplink signals of different clients 104 simultaneously reach the base station 102, so as to ensure the orthogonality between the different uplink signals, such that the base station 102 can correctly decode the uplink data. For the purpose mentioned above, Time Advancement (TA) mechanism may be used to control the time offset between signals transmitted by different clients 104, so that the time when the uplink signals arrives the base station 102 can be adjusted. Generally, for a client 104 far from the base station 102, uplink data needs to be sent earlier than a client 104 closer to the base station 102 due to larger transmission delay, i.e., with a larger TA value.

According to the embodiments of the present disclosure, the client 104 may acquire transmission resource from unlicensed spectrum based on LBT procedure. LBT is a type of network access scheme, in which a transmission end (which can be the base station 102 or the client 104) may monitor a channel for a period, and start to transmit data when it determines that no other equipment is using the channel (e.g., the measured energy level on the available channel is smaller than a threshold). In an embodiment, the transmission end detects whether the channel is occupied and detects when the channel is available for use by using wireless network carrier detection mechanism (e.g., Clear Channel Assessment (CCA)).

After successfully acquiring transmission resource from unlicensed spectrum, the client 104 may use the processing circuit 1044 to control the transceiver 1042 to send back an LBT success indicator to the base station 102. That is, the client 104 may send an LBT success indicator to the base station 102 after LBT success. The term "LBT success" is directed to a situation that the client 104 listens to the channel for a period (e.g., a pre-configured/pre-defined time), and determines that no other equipment is transmitting data on the channel (e.g., the energy level measured on the channel is smaller than a threshold). After LBT success, the client 104 can use the channel to transmit signals.

In an embodiment, after sending the LBT success indicator, the client 104 uses the processing circuit 1044 to control the transceiver 1042 to send a plurality of preamble signals, and obtains Random Access Response (RAR) from the base station 102. The preamble signal can be a random access (RA) preamble signal for example. The client 104 may adjust the transmission timing of signals with TA values in RAR, and perform uplink transmission on unlicensed spectrum with the base station 102 based on the adjusted transmission timing of signals.

Figure 5:
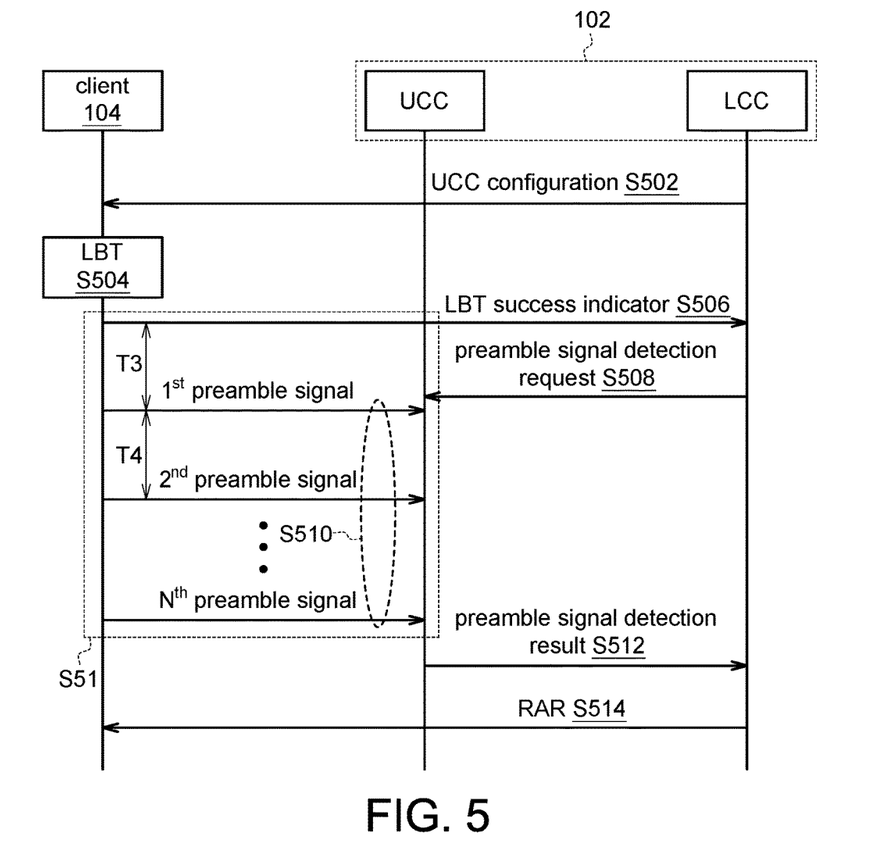
FIG. 5 is a system flowchart of uplink signal synchronization according to an embodiment of the present disclosure.

FIG. 5 is a system flowchart of uplink signal synchronization according to an embodiment of the present disclosure. First, the base station 102 sends Unlicensed Component Carrier (UCC) configuration information to the client 104 through LCC (step S502). The UCC configuration information includes, for example, timing synchronization information, LBT indicator transmission resource on LCC, and competitive Random Access (RA) configuration.

Then, the client 104 executes LBT (step S504), and, as LBT success (i.e., detected that the channel is not occupied by other equipment and is available for establishing connection), sends an LBT success indicator to the base station 102 to notify the base station 102 that preamble signals are to be sent (step S506). In response to the received LBT success indicator, the base station 102 prepares for receiving the preamble signals from the client 102 on UCC by transmitting a preamble signal detection request (step S508). In an embodiment, based on non-contention based RA mechanism, the base station 102 sends preamble signal configuration information to the client 104, and then the client 104 initiates the transmission of preamble signal.

In an embodiment, after sending an LBT success indicator, the client 104 uses the processing circuit 1044 to control the transceiver 1042 to send reservation signals to occupy the transmission resource (step S51), and sends a plurality of preamble signals, for example, the first to the $N^{th}$ preamble signals, where N is a positive integer, until a timer T3 expiring (step S510). As shown in FIG. 5, the client 104 sends the first to the $N^{th}$ preamble signals based on a timer T4. For example, the period for sending each preamble signal is set by the timer T4.

In an embodiment, to effectively utilize the acquired transmission resource after LBT success, the base station 102 may configure the quantity and the required transmission power of the preamble signals sent by the client 104, such that the client 104 uses the processing circuit 1044 to control the transceiver 1042 to transmit the preamble signals based on the configured quantity and/or transmission power (e.g., using incremental/decreasing transmission power to transmit the preamble signals). In other words, the client 104 may use the processing circuit 1044 to control the transceiver 1042 to transmit the plurality of preamble signals in different transmission power, or transmit the plurality of preamble signals with a maximum power.

The preamble signal configuration information can be sent to the client 104 on LCC via one or more Physical Downlink Control Channel (PDCCH) commands. In another embodiment, the client 104, after LBT success, may randomly select a preamble signal to send, wherein the quantity of preamble signals and the corresponding transmission power may be configured previously.

After sending the preamble signals, if the client 104 does not receive RAR from the base station 102, the client 104 may consider the preamble signals as failures and then performs retransmission.

After receiving preamble signals from the client 104 on the corresponding UCC, the base station 102 sends RAR to the client 104 through LCC on licensed spectrum (steps S512, S514) in response to the preamble signal detection results on UCC. The RAR includes, for example, preamble identifiers (IDs), TA information relative to a preamble signal, and transmission power control (TPC) commands.

The client 104 may use TA information in RAR to synchronize the uplink transmission. In an embodiment, the base station 102 may further use the RAR to inform the client 104 which of the preamble signals and the transmission power thereof is appropriate, such that the client 104 is aware of the most appropriate transmission power. For example, the client 104 may select a preamble signal ID corresponding to a selected preamble signal from the RAR. The client 104 may adjust the transmission power to a level corresponding to the transmission power of the selected preamble signal, such that the transmission can be performed under a relatively appropriate transmission power.

If the base station 102 does not receive any preamble signal, the base station 102 may consider that the client 104 is not under the coverage of UCC. In an embodiment, a maximum retry number can be configured and the client 104 will give up the UCC transmission if the client 104 does not receive any RAR from the base station 102 with multiple retry exceeding the number. In this situation, the client 104 may aware that it is not under the UCC coverage of the base station 102.

It is noted that the "LCC" and the "UCC" denoted in block 102 of the figure are corresponding to operations of one or more base stations 102, rather than limiting to operations of the same one base station 102.

3. Data Transmission Stage

After synchronization is complete, the base station 102 may grant uplink transmission resource to the client 104 through LCC's PDCCH.

In an embodiment, the client 104 firstly performs LBT, then, after LBT success, the client 104 uses the processing circuit 1044 to control the transceiver 1042 to transmit an LBT success indicator to the base station 102. The LBT success indicator can be transmitted through, for example, uplink LCC or UCC. In response to the LBT success indicator, the base station 102 may send uplink resource grant to the client 104. Afterwards, the client 104 is allowed to use the processing circuit 1044 to control the transceiver 1042 to transmit uplink data according to the resource grant.

Figure 6:
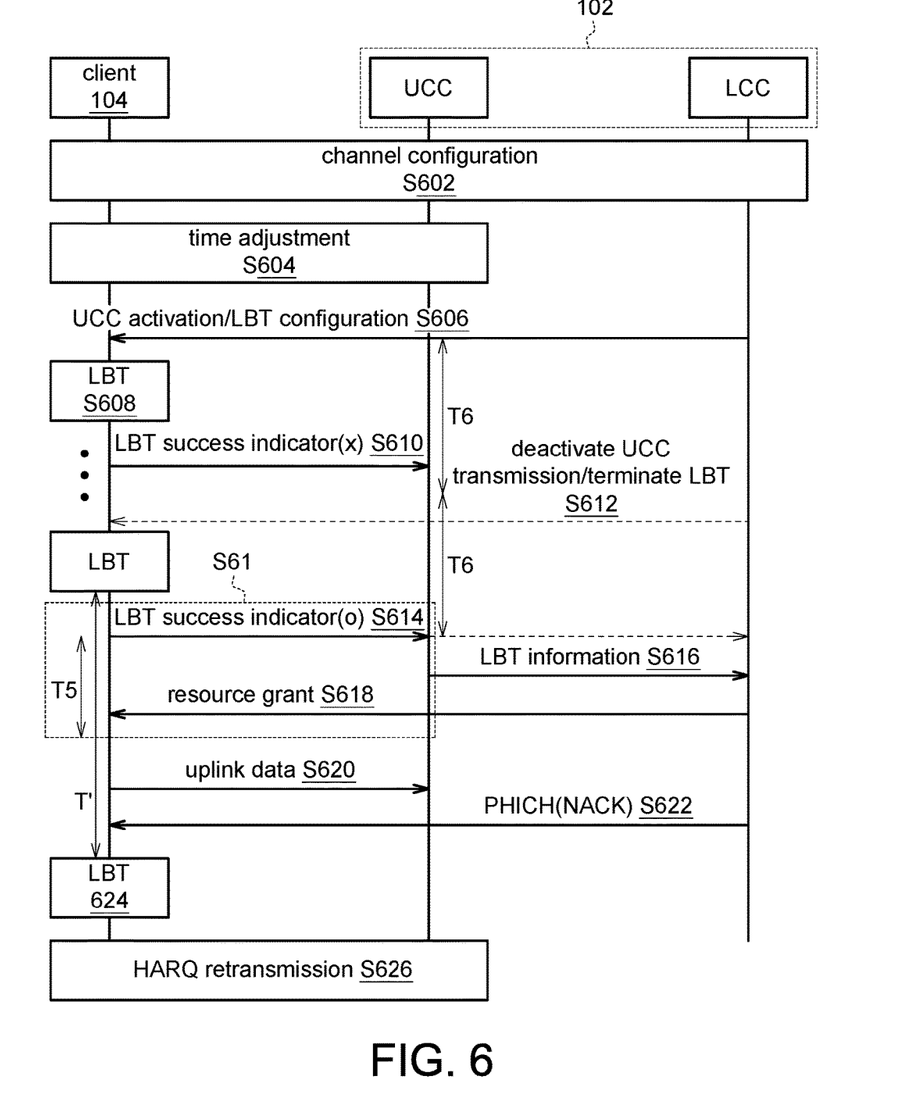
FIG. 6 shows a system flowchart of uplink data transmission according to an embodiment of the present disclosure.

FIG. 6 shows a system flowchart of uplink data transmission according to an embodiment of the present disclosure. As shown in FIG. 6, first, the client 104 and the base station 102 perform channel configuration and time adjustment to complete synchronization (step S602, S604). In step S602, the base station 102 configures to employ either narrow-band LBT or wide-band LBT. The narrow-band LBT indicates, for example, performing energy detection toward particular resource blocks. The wide-band LBT indicates performing energy detection toward whole bands.

Then, the base station 102 transmits UCC activation/LBT configuration information to the client 104 (step S606). Afterwards, the client 104 performs LBT to try to acquire transmission resources (step S606). During this period, the base station 102 may, for example, periodically monitor the unlicensed spectrum (e.g., using the timer T6 to configure the period) for receiving the LBT success indicator. If the base station 102 does not correctly receive the LBT success indicator or does not receive the indicator (step S610), the base station 102 may inform the client 104 to deactivate UCC transmission/terminate LBT (step S612), and/or shut down its receiving function for unlicensed spectrum. In an embodiment, the LBT success indicator may further indicate the available transmission opportunity (TXOP) time T' and the detailed LBT results (e.g., RSSI).

After using the processing circuit 1044 to control the transceiver 1042 to send an LBT success indicator (step S614), the client 104 may make reservation to occupy the transmission resource (step S61). For example, after the client 104 successfully acquires the transmission resource from unlicensed spectrum, it may uses the processing circuit 1044 to control the transceiver 1042 to send one or more reservation signals on the unlicensed spectrum to occupy the transmission resource until receiving uplink resource grant from the base station 102, or until a timer expired (e.g., in a duration of a timer T5). Or, the client 104 may send Network Allocation Value (NAV) signaling to occupy the transmission resource through wireless network (e.g., wireless LAN (WLAN) or Wi-Fi). Or, the base station 102 may occupy the transmission resource for the client 104 by sending reservation signals.

Then, the client 104 uses the processing circuit 1044 to control the transceiver 1042 to perform uplink data transmission on the unlicensed spectrum according to the uplink resource grant. In an embodiment, the client 104 may use the processing circuit 1044 to control the transceiver 1042 to send the LBT success indicator on the unlicensed spectrum to indicate that the transmission resource is acquired. In an embodiment, the client 104 may use the processing circuit 1044 to control the transceiver 1042 to send the LBT success indicator on licensed spectrum, such as LCC, to indicate that the transmission resource is acquired. In an embodiment, the client 104 uses the processing circuit 1044 to control the transceiver 1042 to send one or more reservation signals on unlicensed spectrum to occupy the channel. In an embodiment, the reservation signal may include LBT success indicator information.

After receiving information of LBT success from the client 104 (step S616), the base station 102 sends resource grant to the client 104 (step S618). The base station 102 may send uplink resource grant with Carrier Indicator Field (CIF) to the client 104, for example, through PDCCH on LCC, to indicate a carrier corresponding to the resource grant. In an embodiment, the base station 102 may, for example, send the uplink resource grant through PDCCH on UCC to the client 104. Then, the client 104 uses the processing circuit 1044 to control the transceiver 1042 to transmit uplink data on unlicensed spectrum according to the resource grant (step S620).

If the base station 102 successfully decodes data from the client 104 (e.g., packet data unit (PDU)), the base station 102 may reply Acknowledgement (ACK) to the client 104 at Physical Hybrid ARQ Indicator Channel (PHICH). Conversely, if the base station 102 fails to decode data from the client 104, the base station 102 may reply Negative-Acknowledgement (NACK) to the client 104 at PHICH. In this situation, the client 104 may retry LBT, and perform retransmission of Hybrid Automatic Repeat Request (HARQ) (step S624, S626).

Figure 7:
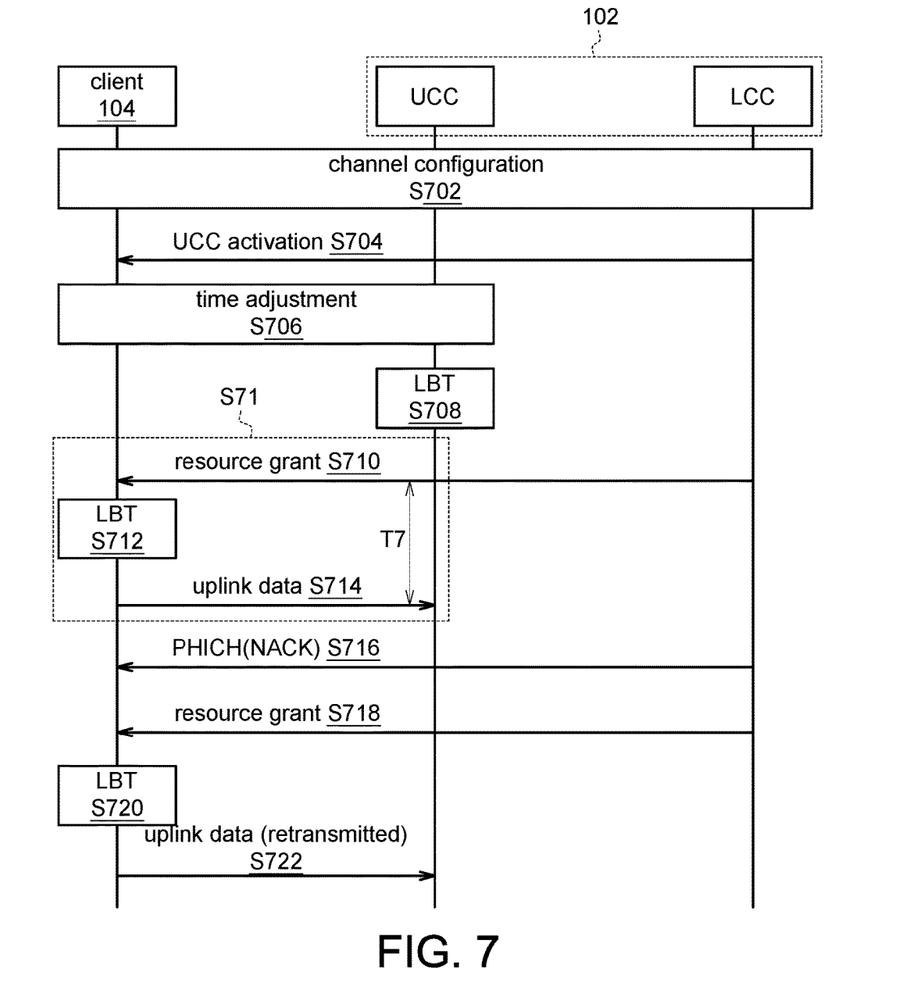
FIG. 7 shows a system flowchart of uplink data transmission method according to an embodiment of the present disclosure.

FIG. 7 shows a system flowchart of uplink data transmission method according to an embodiment of the present disclosure. In the example of FIG. 7, the base station 102 firstly sends uplink resource grant to the client 104. Then, the client 104 performs LBT, and transmits uplink data according to the resource grant after acquiring transmission resource.

As shown in FIG. 7, firstly, the client 104 and the base station 102 performs channel configuration (step S702). For example, the base station 102 allocates part or all resource blocks to the client 104, so that the client 104 can use the resource grant to perform narrow-band LBT or wide-band LBT.

Then, the base station 102 notifies the client 104 to activate UCC transmission (step S704). After finishing time adjustment of uplink transmission (step S706), the base station 102 performs LBT (step S708), and, after acquiring transmission resource, the base station 102 sends uplink resource grant to the client 104 (step S710). In an embodiment, the base station 102 gives uplink resource grant to the client 104 when (1) it passes LBT (LBT success) or (2) according to coordination results (e.g., Time Division Multiplexing (TDM)).

Then, the base station 102 sends reservation signals to occupy the transmission resource (step S71) until a timer T7 expired. Or, the base station 102 sends NAV signaling through wireless network (e.g., WLAN, Wi-Fi) for reserving the transmission resource. Or, the base station 102 does not send any reservation signal, and tries to get uplink data on UCC from the client 104 before the timer T7 expired; in other words, the uplink resource grant is only available before the timer T7 expiring.

After receiving resource grant from the base station 102, the client 104 executes LBT to try to acquire transmission resource (step S712), and uses the processing circuit 1044 to control the transceiver 1042 to execute data transmission on UCC when LBT is passed (step S714). Specifically, when the client 104 receives uplink resource grant from the base station 102, LBT procedure is triggered. After successfully acquiring transmission resource from unlicensed spectrum, the client 104 executes, according to the obtained uplink resource grant, data transmission on the unlicensed spectrum by using the processing circuit 1044 to control the transceiver 1042. In an embodiment, after passing LBT, the client 104 uses the processing circuit 1044 to control the transceiver 1042 to send the LBT success indicator to the base station 102 to notify the base station 102 that it has passed LBT.

If the base station 102 cannot successfully decode data from the client 104, the base station 102 will reply NACK to the client 104 through PHICH (step S716) and retransmit resource grant to the client 104 (step S718). The client 102 may execute LBT again (step S720) and use the processing circuit 1044 to control the transceiver 1042 to retransmit uplink data after LBT success (step S722). In another embodiment, if the base station 102 cannot successfully decode data from the client 104, it does not need to reply NACK to the client 104 (step S716), and will retransmit resource grant to the client 104 (step S718). The client 102 may execute LBT again (step S720), and use the processing circuit 1044 to control the transceiver 1042 to retransmit uplink data after passing LBT (step S722).

In some embodiments, the proposed communication solution may exploit Discontinuous Reception (DRX) mechanism to save power. Specifically, with DRX mechanism, the base station 102 may control the client 104 to operate in a wakeup mode in an on period of a DRX cycle, and to operate in a sleep mode to save power in a sleep period of the DRX cycle. However, considering that the client 104 usually acquires transmission resource on unlicensed spectrum based on contention, some implementations are proposed below, to ensure that the client 104 can effectively utilize transmission resource acquired under DRX mechanism.

Figure 8:
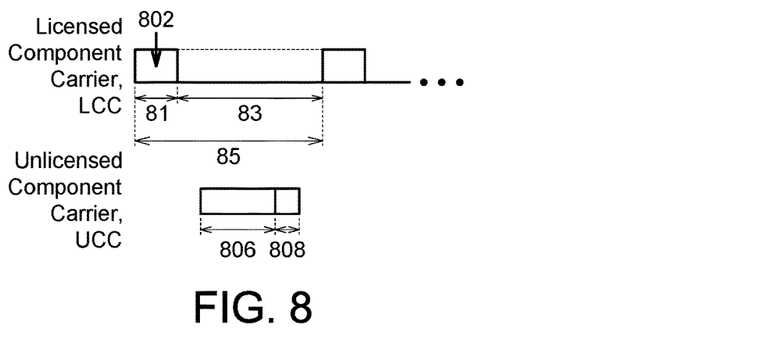
FIG. 8 shows timing of signals based on DRX mechanism according to an embodiment of the present disclosure.

FIG. 8 shows timing of signals based on DRX mechanism according to an embodiment of the present disclosure. In the example of FIG. 8, the base station 102 sends a mute DRX command 802 to the client 104 through licensed spectrum at an ON period 81 of the DRX cycle 85, such that the client 104 does not enter the sleep mode at a sleep period 83 of the DRX cycle 85. By this way, when the base station 102/the client 104 finishes LBT during period 806, it will directly enter the information transmission period 808. The client 104 would not enter the sleep mode which results in failure reception of information from the base station 102.

Figure 9:
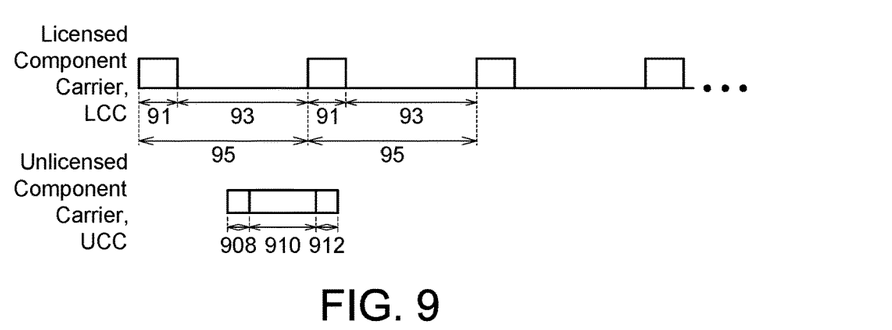
FIG. 9 shows timing of signals based on DRX mechanism according to another embodiment of the present disclosure.

FIG. 9 shows timing of signals based on DRX mechanism according to another embodiment of the present disclosure. In the example of FIG. 9, the base station 102 reserves the transmission resource until it enters the ON period 91 of the DRX cycle 95. As shown in FIG. 9, if LBT is performed by the base station 102 and LBT is successful at period 908 during the sleep period 93 of the DRX cycle 95, the base station 102 sends reservation signals during the subsequent period 910 to occupy the transmission resource, until it enters period 912 of the next ON period 91, then starts data transmission. In an embodiment, one or more dummy packets are sent on UCC to occupy the transmission resource until the next DRX ON period, to avoid other access entity from acquiring the transmission resource of the unlicensed spectrum.

Figure 10:
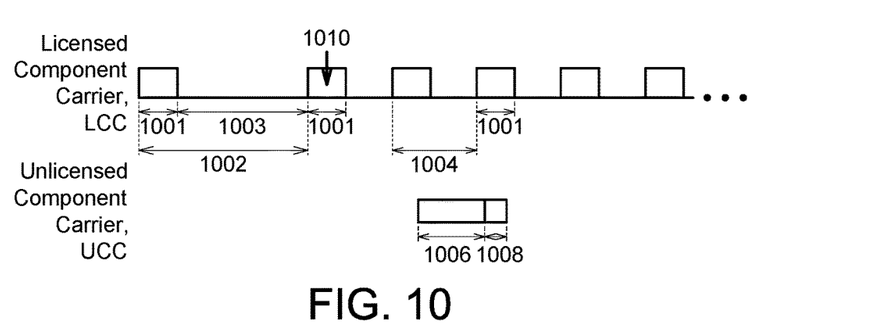
FIG. 10 shows timing of signals based on DRX mechanism according to yet another embodiment of the present disclosure.

FIG. 10 shows timing of signals based on DRX mechanism according to yet another embodiment of the present disclosure. In this embodiment, the base station 102 configures two sets of parameters for DRX, and the client 104 uses the different DRX parameters to configure UCC. As shown in FIG. 10, the client 104 selectively adopts a first DRX cycle 1002 and a second DRX cycle 1004, wherein the second DRX cycle 1004 is shorter than first DRX cycle 1002. Before receiving measurement configuration information 1010 (e.g., UCC measurement configuration information), the client 104 may operate in the first DRX cycle 1002, which includes an ON period 1001 and a sleep period 1003. The client 104 may switch between the wakeup mode and the sleep mode based on the first DRX cycle 1002.

After receiving the measurement configuration information 1010, the client 104 may automatically switch from the first DRX cycle to the second DRX cycle. Since the second DRX cycle is relatively shorter, the client 104 has a higher chance to perform transmission at the ON period. As shown in FIG. 10, if LBT is finished in the end of period 1006, since the second DRX cycle 1004 is relatively shorter, time after LBT may just at the ON period 1001 of the second DRX cycle 1004. Thus, data transmission can be performed at the subsequent period 1008.

Figure 11:
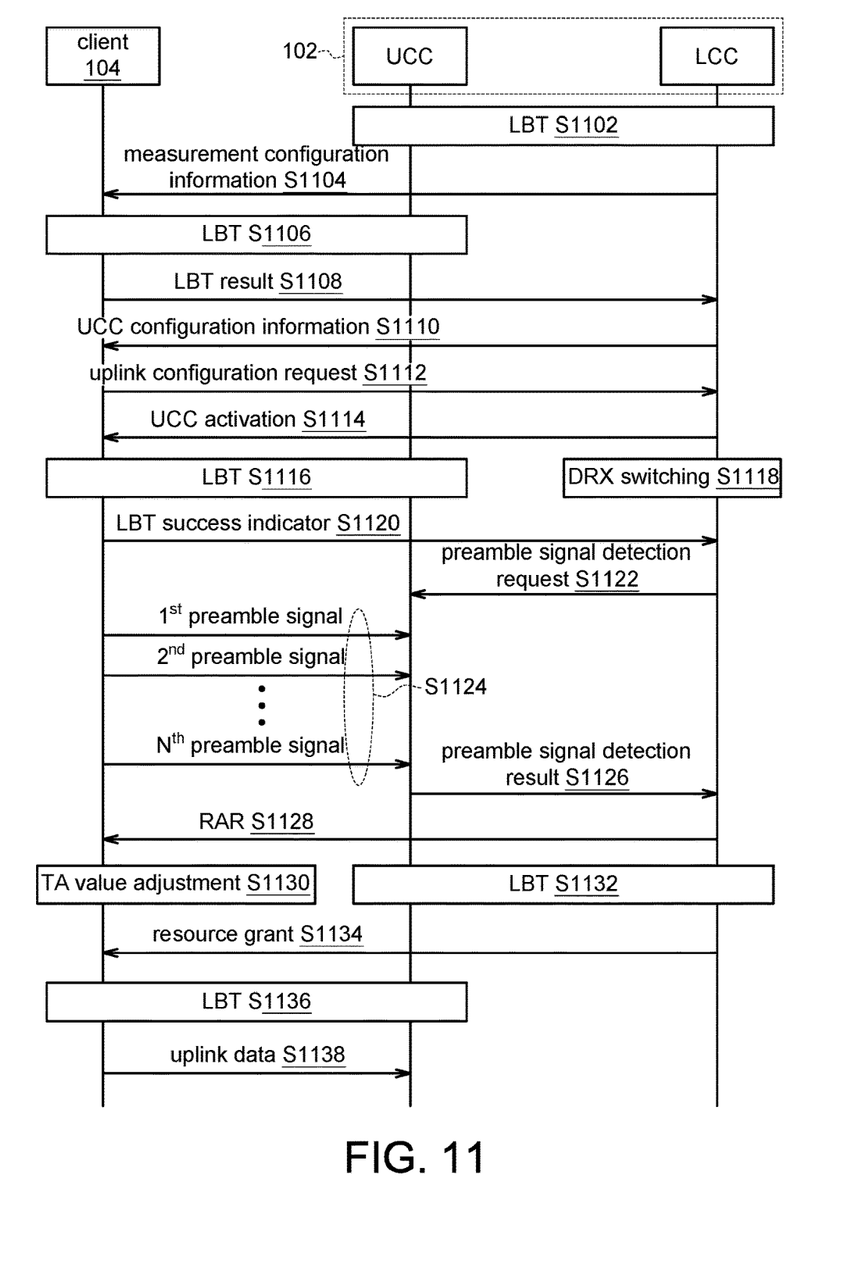
FIG. 11 shows a system flowchart of uplink data transmission method according to an embodiment of the present disclosure.

FIG. 11 shows a system flowchart of uplink data transmission method according to an embodiment of the present disclosure. In this illustrative embodiment, the base station 102 controls the client 104 to perform channel measurement, and makes channel selection with the report obtained from measurement by the client 104. After adjusting TA value to synchronize with the client 104, the base station 102 sends uplink resource grant to the client 104. Then, the client 104 executes LBT, and uses the processing circuit 1044 to control the transceiver 1042 to perform uplink data transmission according to the resource grant after acquiring transmission resource. As for DRX mechanism, the base station 102 adopts the embodiment of FIG. 10, to make the client 104 selectively use different DRX cycles.

As shown in FIG. 11, first, the base station 102 executes LBT on UCC (step S1102) to try to acquire transmission resource. When LBT is successful, the base station 102 sends measurement configuration information to the client 104 (step S1104). In response to the measurement configuration information, the client 104 executes LBT on UCC, and uses the processing circuit 1044 to control the transceiver 1042 to send LBT results (steps S1106, S1108). In response to the LBT results, the base station 102 further sends UCC configuration information to the client 104 to notify the client 104 the available UCC resource (step S1110). Then, the client 104 uses the processing circuit 1044 to control the transceiver 1042 to send uplink configuration request to request resource for uplink transmission (step S1112). Afterwards, the base station 102 notifies the client 104 to activate UCC through LCC, such that the client 104 can use the coordinated UCC to perform data transmission (step S1114).

After UCC is activated, the client 104 may execute LBT to try to acquire transmission resource (step S1116). During this period, the base station 102, for example, performs DRX switch, such that the client 104 operates in different DRX cycles (step S1118).

After LBT success, the client 104 may uses the processing circuit 1044 to control the transceiver 1042 to send an LBT success indicator to the base station 102 to notify the base station 102 that preamble signals are the next to be sent (step S1120). In response to the received LBT success indicator, the base station 102 may transmit a preamble signal detection request to prepare for receiving the preamble signal on UCC from the client 104 (step S1122). Then, the client 104 sends multiple preamble signals (e.g., the first to the $N^{th}$ preamble signals) (step S1124). In response to the preamble signal detection results on UCC, the base station 102 sends RAR to the client 104 (steps S1126, S1128).

The client 104 may adjust its TA value for synchronization according to the TA information in RAR (step S1130). Meanwhile, the base station 102 executes LBT, and sends resource grant to the client 104 when LBT success (steps S1132, S1134). After receiving the resource grant, the client 104 executes LBT, and when LBT success, the client 104 uses the processing circuit 1044 to control the transceiver 1042 to transmit uplink data on UCC based on the resource grant (step S1138).

In summary, the proposed communication method and device allow the client to perform uplink data transmission on unlicensed spectrum, so as to effectively expand currently available spectrum, thereby increasing data throughput.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication method, adapted to a communication device, for uplink transmission by using unlicensed spectrum, comprising:
   acquiring a transmission resource from the unlicensed spectrum based on a listen-before-talk (LBT) procedure;
   sending an LBT success indicator to a base station after successfully acquiring the transmission resource from the unlicensed spectrum;
   receiving an uplink resource grant from the base station; and
   performing uplink data transmission with the base station on the unlicensed spectrum according to the uplink resource grant,
   wherein the communication method further comprises:
   after sending the LBT success indicator, sending a plurality of preamble signals to the base station, and obtaining a random access response (RAR) from the base station;
   using a time advancement (TA) value in the RAR to adjust transmission timing of signals; and
   based on the adjusted transmission timing of signals, performing the uplink data transmission with the base station on the unlicensed spectrum.

2. The communication method according to claim 1, further comprising:
transmitting the preamble signals with different transmission powers.

3. The communication method according to claim 1, further comprising:
transmitting the preamble signals with a maximum transmission power.

4. The communication method according to claim 1, further comprising:
obtaining a preamble signal identifier (ID) from the RAR, wherein the preamble signal ID corresponds a selected preamble signal of the preamble signals; and
adjusting transmission power to a level corresponding to the transmission power of the selected preamble signal.

5. The communication method according to claim 1, further comprising:
after successfully acquiring the transmission resource from the unlicensed spectrum, sending one or more reservation signals on the unlicensed spectrum to occupy the transmission resource, or sending a network allocation value (NAV) signaling through a wireless network to occupy the transmission resource.

6. The communication method according to claim 1, further comprising:
switching between a wakeup mode and a sleep mode based on a first DRX cycle; and
after receiving measurement configuration information, switching from the first DRX cycle to a second DRX cycle;
wherein the second DRX cycle is shorter than the first DRX cycle.

7. The communication method according to claim 1, further comprising:
measuring one or more channels on the unlicensed spectrum to send back a report to the base station, wherein the report comprises a list including channel entries ordered by channel quality.

8. The communication method according to claim 1, further comprising:
measuring one or more channels on the unlicensed spectrum to send back a report to the base station, wherein the report comprises a mapping table of channel measurement results, in which channels in the unlicensed spectrum occupied by radar or other high prioritized equipment are marked.

9. The communication method according to claim 1, further comprising:
measuring one or more channels on the unlicensed spectrum according to measurement configuration information to make a report; and
sending back the report to the base station, such that the base station uses the report to select a channel from the unlicensed spectrum for the uplink data transmission.

10. The communication method according to claim 9, further comprising:
receiving the measurement configuration information from the base station, wherein the measurement configuration information comprises a timer; and
sending back the report before the timer expired, otherwise considering the report as invalid.

11. The communication method according to claim 9, further comprising:
receiving a channel selection result from the base station, wherein the channel selection result is generated by the base station based on a channel measurement procedure;
performing another channel measurement procedure on a candidate channel indicated by the channel selection result, and sending back a result of the another channel measurement procedure to the base station, such that the base station uses the result of the another channel measurement procedure to select a channel from the unlicensed spectrum for the uplink data transmission.

12. A communication device, adapted to performing uplink transmission by using unlicensed spectrum, comprising:
a transceiver; and
a processing circuit, coupled to the transceiver and configured for:
acquiring a transmission resource from the unlicensed spectrum based on a listen-before-talk (LBT) procedure;
sending an LBT success indicator to a base station after successfully obtaining the transmission resource from the unlicensed spectrum;
receiving an uplink resource grant from the base station; and
controlling the transceiver to perform uplink data transmission with the base station on the unlicensed spectrum according to the uplink resource grant,
wherein after sending the LBT success indicator, the communication device controls the transceiver to send a plurality of preamble signals to the base station, obtains a random access response (RAR) from the base station, uses a time advancement (TA) value in the RAR to adjust transmission timing of signals, and based on the adjusted transmission timing of signals, controls the transceiver to perform the uplink data transmission with the base station on the unlicensed spectrum.

13. The communication device according to claim 12, wherein the processing circuit controls the transceiver to transmit the preamble signals with different transmission powers.

14. The communication device according to claim 12, wherein the processing circuit controls the transceiver to transmit the preamble signals with a maximum transmission power.

15. The communication device according to claim 12, wherein the processing circuit obtains a preamble signal identifier (ID) corresponding to a selected preamble signal of the preamble signals from the RAR, and adjusts transmission power of the transceiver to a level corresponding to the transmission power of the selected preamble signal.

16. The communication device according to claim 12, wherein, after the communication device successfully acquires the transmission resource from the unlicensed spectrum, the processing circuit controls the transceiver to send one or more reservation signals to occupy the transmission resource on the unlicensed spectrum, or to send a network allocation value (NAV) signaling through a wireless network to occupy the transmission resource.

17. The communication device according to claim 12, wherein the communication device switches between a wakeup mode and a sleep mode based on a first DRX cycle, and when the transceiver receives measurement configuration information, the communication device switches from the first DRX cycle to a second DRX cycle;
wherein the second DRX cycle is shorter than the first DRX cycle.

18. The communication device according to claim 12, wherein the communication device measures one or more channels on the unlicensed spectrum to send back a report to the base station, wherein the report comprises a list including channel entries ordered by channel quality.

19. The communication device according to claim 12, wherein the communication device measures one or more channels on the unlicensed spectrum to send back a report to the base station, wherein the report comprises a mapping table of channel measurement results in which channels in the unlicensed spectrum occupied by radar or other high prioritized equipment are marked.

20. The communication device according to claim 12, wherein the communication device measures one or more channels on the unlicensed spectrum according to measurement configuration information to obtain a report, and sends back the report to the base station, such that the base station uses the report to select a channel from the unlicensed spectrum for the uplink data transmission.

21. The communication device according to claim 20, wherein the measurement configuration information comprises a timer; and
the communication device receives the measurement configuration information from the base station, and sends back the report before the timer expired, otherwise considering the report as invalid.

22. The communication device according to claim 20, wherein the communication device receives a channel selection result from the base station, wherein the channel selection result is generated by the base station based on a channel measurement procedure; and
the communication device performs another channel measurement procedure on a candidate channel indicated by the channel selection result, and sends back a result of the another channel measurement procedure to the base station, such that the base station uses the result of the another channel measurement procedure to select a channel from the unlicensed spectrum for the uplink data transmission.

23. A communication method, adapted to a communication device, for uplink transmission by using unlicensed spectrum, comprising:

acquiring a transmission resource from the unlicensed spectrum based on a listen-before-talk (LBT) procedure;
sending an LBT success indicator to a base station after successfully acquiring the transmission resource from the unlicensed spectrum;
receiving an uplink resource grant from the base station; and
performing uplink data transmission with the base station on the unlicensed spectrum according to the uplink resource grant,
wherein the communication method further comprises:
in response to a mute discontinuous reception (DRX) command, prohibiting the communication device from entering a sleep mode during a sleep period of a DRX cycle.

24. A communication device, adapted to performing uplink transmission by using unlicensed spectrum, comprising:
a transceiver; and
a processing circuit, coupled to the transceiver and configured for:
acquiring a transmission resource from the unlicensed spectrum based on a listen-before-talk (LBT) procedure;
sending an LBT success indicator to a base station after successfully obtaining the transmission resource from the unlicensed spectrum;
receiving an uplink resource grant from the base station; and
controlling the transceiver to perform uplink data transmission with the base station on the unlicensed spectrum according to the uplink resource grant,
wherein in response to a mute discontinuous reception (DRX) command, the processing circuit prohibits the communication device from entering a sleep mode during a sleep period of a DRX cycle.

* * * * *